US012455596B2

(12) United States Patent
Yen et al.

(10) Patent No.: US 12,455,596 B2
(45) Date of Patent: *Oct. 28, 2025

(54) FOLDABLE ELECTRONIC DEVICE

(71) Applicant: SYNCMOLD ENTERPRISE CORP., New Taipei (TW)

(72) Inventors: Ching-Hui Yen, New Taipei (TW); Chun-Hao Huang, New Taipei (TW); Chien-Cheng Yeh, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 214 days.

This patent is subject to a terminal disclaimer.

(21) Appl. No.: 18/486,785

(22) Filed: Oct. 13, 2023

(65) Prior Publication Data

US 2024/0036607 A1 Feb. 1, 2024

Related U.S. Application Data

(63) Continuation-in-part of application No. 18/176,917, filed on Mar. 1, 2023.

(60) Provisional application No. 63/416,111, filed on Oct. 14, 2022, provisional application No. 63/325,962, filed on Mar. 31, 2022.

(30) Foreign Application Priority Data

Jun. 21, 2022 (TW) ................................. 111206525
Jul. 14, 2023 (TW) ................................. 112207395

(51) Int. Cl.
*G06F 1/16* (2006.01)
*H04M 1/02* (2006.01)

(52) U.S. Cl.
CPC .......... *G06F 1/1641* (2013.01); *G06F 1/1652* (2013.01); *G06F 1/1681* (2013.01); *H04M 1/022* (2013.01); *H04M 1/0268* (2013.01)

(58) Field of Classification Search
CPC ..... H04M 1/0266–0269; H04M 1/0206–0222; G06F 1/1681; G06F 1/1652
See application file for complete search history.

(56) References Cited

U.S. PATENT DOCUMENTS 10,747,269 B1 * 8/2020 Choi .................... G06F 1/1652
10,824,204 B2 * 11/2020 Lin ...................... E05D 11/082

(Continued)

*Primary Examiner* — Patrick F Marinelli
(74) *Attorney, Agent, or Firm* — MUNCY, GEISSLER, OLDS & LOWE, P.C.

(57) ABSTRACT

A foldable electronic device comprises a central base, a hinge module, a plurality of wings, a plurality of driving element, a plurality of panel bodies, an elastic module and a flexible screen. The hinge module penetrates through the central base and capable of rotating synchronously and reversely. The driving elements are sleeved on and synchronously rotate with the hinge module. The panel bodies are pivotally connected to the wings and can linearly slide relative to the driving element. The flexible screen is disposed on panel bodies and the wings, and comprises a bendable area. When the panel bodies are in the unfolded status, the flexible screen is flattened, and the wings and the central base support the bendable area. When the panel bodies are in the folded status, the bendable area is bent, and the wings and the central base define an accommodating space for accommodating the bendable area.

19 Claims, 22 Drawing Sheets

(56) References Cited

U.S. PATENT DOCUMENTS

| | | | |
|---|---|---|---|
| 11,340,661 B2* | 5/2022 | Yen | G06F 1/1616 |
| 11,567,543 B2* | 1/2023 | Siddiqui | G06F 1/1679 |
| 11,615,720 B2* | 3/2023 | Park | H04M 1/022 |
| | | | 361/679.01 |
| 11,617,277 B2* | 3/2023 | Huang | F16C 11/04 |
| | | | 361/807 |
| 11,669,132 B2* | 6/2023 | Siddiqui | G06F 1/1647 |
| | | | 361/679.27 |
| 11,843,710 B2* | 12/2023 | Huang | H04M 1/0214 |
| 12,093,087 B2* | 9/2024 | Liu | H04M 1/022 |
| 12,222,770 B2* | 2/2025 | Zhang | G06F 1/1616 |
| 12,235,687 B2* | 2/2025 | Siddiqui | G06F 1/1618 |
| 12,287,681 B2* | 4/2025 | Siddiqui | G06F 1/1683 |
| 2021/0263565 A1* | 8/2021 | Yen | G06F 1/1681 |
| 2022/0068167 A1* | 3/2022 | Park | G06F 1/1616 |
| 2022/0100238 A1* | 3/2022 | Siddiqui | G06F 1/1641 |
| 2022/0100239 A1* | 3/2022 | Siddiqui | G06F 1/1618 |
| 2022/0167514 A1* | 5/2022 | Huang | H05K 5/0226 |
| 2022/0407950 A1* | 12/2022 | Huang | H04M 1/0268 |
| 2023/0053947 A1* | 2/2023 | Liu | G06F 1/1652 |
| 2023/0102766 A1* | 3/2023 | Huang | H04M 1/022 |
| | | | 455/575.3 |
| 2023/0168720 A1* | 6/2023 | Siddiqui | G06F 1/1681 |
| | | | 361/679.28 |
| 2023/0221773 A1* | 7/2023 | Zhang | H04M 1/022 |
| | | | 361/679.27 |
| 2023/0266804 A1* | 8/2023 | Siddiqui | G06F 1/1683 |
| | | | 361/679.27 |
| 2023/0319173 A1* | 10/2023 | Huang | G06F 1/1652 |
| | | | 455/566 |
| 2023/0403347 A1* | 12/2023 | Liu | H04M 1/022 |
| 2023/0421673 A1* | 12/2023 | Huang | G06F 1/1681 |
| 2024/0028084 A1* | 1/2024 | Feng | G09F 9/301 |
| 2024/0036607 A1* | 2/2024 | Yen | G06F 1/1681 |
| 2024/0081008 A1* | 3/2024 | Kim | G06F 1/1652 |
| 2024/0094774 A1* | 3/2024 | Yen | H04M 1/0268 |
| 2024/0171663 A1* | 5/2024 | Yen | G06F 1/1681 |
| 2024/0219978 A1* | 7/2024 | Nagai | H04M 1/0237 |
| 2024/0236216 A1* | 7/2024 | Yen | G06F 1/1641 |
| 2024/0430348 A1* | 12/2024 | Park | F16C 11/045 |
| 2025/0004508 A1* | 1/2025 | Park | H04M 1/022 |
| 2025/0016254 A1* | 1/2025 | Taketomi | F16C 11/04 |
| 2025/0044841 A1* | 2/2025 | Chen | G06F 1/1681 |
| 2025/0053193 A1* | 2/2025 | Choung | G06F 1/1652 |
| 2025/0080633 A1* | 3/2025 | Liao | H04M 1/022 |
| 2025/0133152 A1* | 4/2025 | Liao | G06F 1/1652 |

* cited by examiner

FOLDABLE ELECTRONIC DEVICE

CROSS REFERENCE TO RELATED APPLICATION

This application is a continuation-in-part of U.S. application Ser. No. 18/176,917 filed on Mar. 1, 2023, and claims the benefit of U.S. Provisional Application Ser. No. 63/416,111 filed on Oct. 14, 2022, and the benefit of Taiwan Patent Application Serial No. 112207395 filed on Jul. 14, 2023. Application Ser. No. 18/176,917 claims the benefit of U.S. Provisional Application Ser. No. 63/325,962 filed on Mar. 31, 2022, and the benefit of Taiwan Patent Application Serial No. 111206525 filed on Jun. 21, 2022. The entirety of each Application is incorporated herein by reference.

BACKGROUND OF THE INVENTION

1. Field of the Invention

The present invention relates to a foldable electronic device, especially a foldable electronic device with multiple foldable units for bearing a flexible screen.

2. Description of Related Art

Currently, flexible screens have been widely used in smart phones and tablet devices. If the elements supporting the flexible screen are not well designed, when the flexible screen is folded, the bendable area may suffer from pressure and be damaged, or when the flexible screen is unfolded, the bendable area cannot be completely flattened due to insufficient supporting strength, thus inducing a problem that the flexible screen is unable to sense as users touch the bendable area. Accordingly, a foldable unit structure with good supporting strength is urgently needed, so as to overcome the aforementioned problems.

SUMMARY OF THE INVENTION

An objective of the present disclosure is to provide a foldable electronic device which provides multiple foldable units for setting a flexible screen. The foldable units support the flexible screen when the flexible screen is flattened, and the foldable units accommodate the bendable area of the flexible screen when the flexible screen is bent. Each of the foldable units has two symmetrically arranged wings and a lifting plate. When the first panel body and the second panel body are in the unfolded status, the central lifting plate is lifted to jointly support the bendable area of the flexible screen, so that the bendable area and the non-bendable area are coplanar. In addition, when the first panel body and the second panel body are in the folded status, the lifting plate in the central position descends, and the wings and the lifting plate form an accommodating space for accommodating the bendable area.

Besides, in the present invention, the first supporting plate and the second supporting plate of each of the foldable units has a butting structure respectively to make the first supporting plate and the second supporting plate that are adjacent to each other be connected to each other, and the first supporting plate and the second supporting plate may synchronously move and collectively support the flexible screen. The extending plate of the driving element is disposed in the sliding groove of the bearing element, and the pivot seat of the bearing element penetrates through the penetrating slot of the extending plate, and the latch of the bearing element penetrates through the pivot seat to slidably clamp the extending plate in the bearing element. When the first panel body and the second panel body transform between the unfolded status and the folded status, there is mutual sliding between the first driving element and the first panel body, and between the second driving element and the second panel body.

To achieve the aforesaid objective, the present invention discloses a foldable electronic device which comprises a plurality of foldable units and a flexible screen. Each of the foldable units comprises a central base, a hinge module, a first wing, a first driving element, a first panel body, a second wing, a second panel body, and an elastic module. The central base includes a body portion, a lifting plate, a first arc-shaped groove and a second arc-shaped groove. The first arc-shaped groove and the second arc-shaped groove are formed on the body portion and opposite to each other. The lifting plate is movably disposed on the body portion, and is movable between a highest position and a lowest position. The hinge module includes a first shaft and a second shaft. The first shaft and the second shaft respectively penetrate through the body portion and capable of rotating synchronously and reversely. The first wing includes a first arc-shaped part slidably disposed in the first arc-shaped groove so that the first wing is able to pivot relative to the body portion. The first driving element is sleeved on the first shaft and synchronously rotates with the first shaft. The first panel body includes a first bearing element being pivoted to the first wing and linearly slidable relative to the first driving element. The second wing includes a second arc-shaped part slidably disposed in the second arc-shaped groove so that the second wing is able to pivot relative to the body portion. The second driving element is sleeved on the second shaft and synchronously rotates with the second shaft. The second panel body includes a second bearing element being pivoted to the second wing and linearly slidable relative to the second driving element. The elastic module includes a push element, a first elastic element and a second elastic element. The push element is sleeved on the first shaft and the second shaft, and is movably engaged with the first driving element and the second driving element. The first elastic element is sleeved on the first shaft, and abuts against the push element. The second elastic element is sleeved on the second shaft, and abuts against the push element. The flexible screen is disposed on the first panel body, the first wing, the second panel body and the second wing of each of the foldable units, and comprises a bendable area. The first panel body and the second panel body are convertible between an unfolded status and a folded status. When the first panel body and the second panel body are in the unfolded status, the flexible screen is flattened, the lifting plate is at the highest position to make the first wing, the second wing and the lifting plate collectively support the bendable area. When the first panel body and the second panel body are in the folded status, the flexible screen is bent at the bendable area, the lifting plate is at the lowest position, and the first wing, the second wing and the lifting plate collectively define an accommodating space for accommodating the bendable area.

In one embodiment, the foldable units are arranged along the bendable area, the adjacent foldable units are connected to each other by the corresponding first wing and the second wing.

In one embodiment, the first wing and the second wing include a butting structure respectively, and the first wing and the second wing, adjacent to each other, are mutually connected by the butting structures.

The first driving element includes a first extending plate. The first extending plate has a first penetrating slot. The first bearing element has a first sliding groove, a first pivot seat and a first latch. The first sliding groove is configured to accommodate the first extending plate. The first pivot seat penetrates through the first penetrating slot, and the first latch penetrates through the first pivot seat so that the first extending plate is slidably accommodated in the first bearing element. The second driving element includes a second extending plate. The second extending plate has a second penetrating slot. The second bearing element has a second sliding groove, a second pivot seat and a second latch. The second sliding groove is configured to accommodate the second extending plate. The second pivot seat penetrates through the second penetrating slot. The second latch penetrates through the second pivot seat so that the second extending plate is slidably accommodated in the second bearing element.

The first shaft extends along a first axis, and the first shaft and the first driving element rotate synchronously about the first axis. The first arc-shaped groove defines a first virtual axis. The first wing rotates relative to the body portion about the first virtual axis, and the first axis is parallel to the first virtual axis. The second shaft extends along a second axis, and the second shaft and the second driving element rotate synchronously about the second axis. The second arc-shaped groove defines a second virtual axis. The second wing rotates relative to the body portion about the second virtual axis. The second axis is parallel to the second virtual axis.

The hinge module further includes a fixing base sleeved on the first shaft and the second shaft. The push element has a first driven cam and a second driven cam which are sleeved on the first shaft and the second shaft respectively. The first elastic element is disposed between the first driven cam and the fixing base. The second elastic element is disposed between the second driven cam and the fixing base.

The first driving element includes a first driving cam which is slidably sleeved on the first shaft along the first axis and engages with the first driven cam. The second driving element includes a second driving cam which is slidably sleeved on the second shaft along the second axis and engages with the second driven cam. When the first panel body and the second panel body are in a half-folded status, the first driving cam and the second driving cam abut against the first driven cam and the second driven cam to compress the first elastic element and the second elastic element respectively. When the first panel body and the second panel body are in the unfolded status or the folded status, the first elastic element and the second elastic element are correspondingly released.

The first wing includes a first stopping surface, and the second wing includes a second stopping surface. When the first panel body and the second panel body are in the unfolded status, the first stopping surface abuts against the first bearing element, and the second stopping surface abuts against the second bearing element. When the first panel body and the second panel body are in the folded status, the included angles form between the first stopping surface and the first bearing element, and between the second stopping surface and the second bearing element respectively.

The first wing includes a first supporting plate slidably adjacent to the first bearing element, the second wing includes a second supporting plate slidably adjacent to the second bearing element, and the first supporting plate and the second supporting plate are configured for the flexible screen to lean on.

The first shaft has a first head portion and a first gear portion, and the second shaft has a second head portion and a second gear portion. The first head portion and the second head portion are disposed on the body portion, and the first gear portion and the second gear portion are engaged to make the first shaft and the second shaft rotate reversely and synchronously.

The first shaft and the second shaft are non-circular shafts. The first driving cam and the second driving cam respectively have a non-circular sleeve hole for matching the first shaft and the second shaft. The first driven cam and the second driven cam respectively have a circular sleeve hole to sleeve on the first shaft and the second shaft.

The first sliding groove extends substantially perpendicular to the first axis, and the second sliding groove extends substantially perpendicular to the second axis.

When a number of the foldable units is even, the foldable units are symmetrically arranged perpendicular to a center line of the bendable area.

The two of the foldable units that are farthest to each other are arranged in opposite directions.

The body portion has an upper surface. When the first panel body and the second panel body are in the unfolded status, the lifting plate and the upper surface are substantially coplanar. When the first panel body and the second panel body are in the folded status, the lifting plate descends and retracts from the upper surface relatively.

The central base includes a magnet embedded in the body portion, and the magnet constantly provides a magnetic force to the lifting plate so that the lifting plate tend to descend toward the lowest position. When the first panel body and the second panel body are in the folded status, the magnet magnetically attracts the lifting plate to make the lifting plate descend and retract.

The first driving element includes a first protruding portion, and the second driving element includes a second protruding portion. When the first panel body and the second panel body are in the unfolded status, the first protruding portion and the second protruding portion jointly abut against the lifting plate to the highest position. When the first panel body and the second panel body are in the folded status, the first protruding portion and the second protruding portion are not in contact with the lifting plate, and the magnetic force of the magnet makes the lifting plate descend to the lowest position.

The first wing includes a first edge, and the second wing includes a second edge. The hinge module further includes a first washer sleeved on the first shaft, and a second washer sleeved on the second shaft. When the first panel body and the second panel body are in the unfolded status, the first edge, the second edge, the first washer and the second washer jointly abut against the lifting plate.

The central base further includes a limit screw. The lifting plate further has a convex column. The limit screw penetrates through the body portion to be screwed to the convex column.

The detailed technology and preferred embodiments implemented for the present invention are described in the following paragraphs accompanying the appended drawings for people skilled in this field to well appreciate the features of the claimed invention.

DETAILED DESCRIPTION OF THE PREFERRED EMBODIMENT

Figure 1:
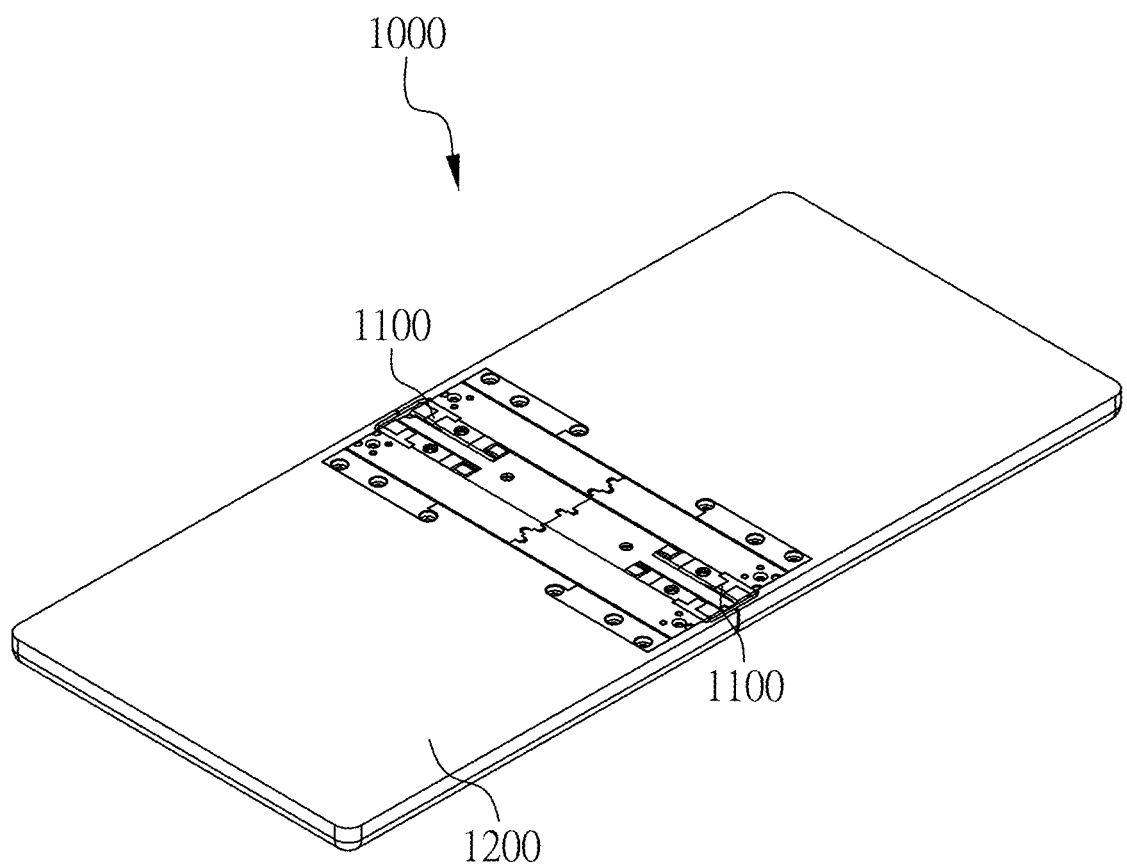
FIG. 1 is a perspective view of the foldable electronic device in the unfolded status according to the present invention.

Reference will now be made in detail to the present embodiments of the invention, examples of which are illustrated in the accompanying drawings, and are not intended to limit the present invention, applications or particular implementations described in these embodiments. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 2:
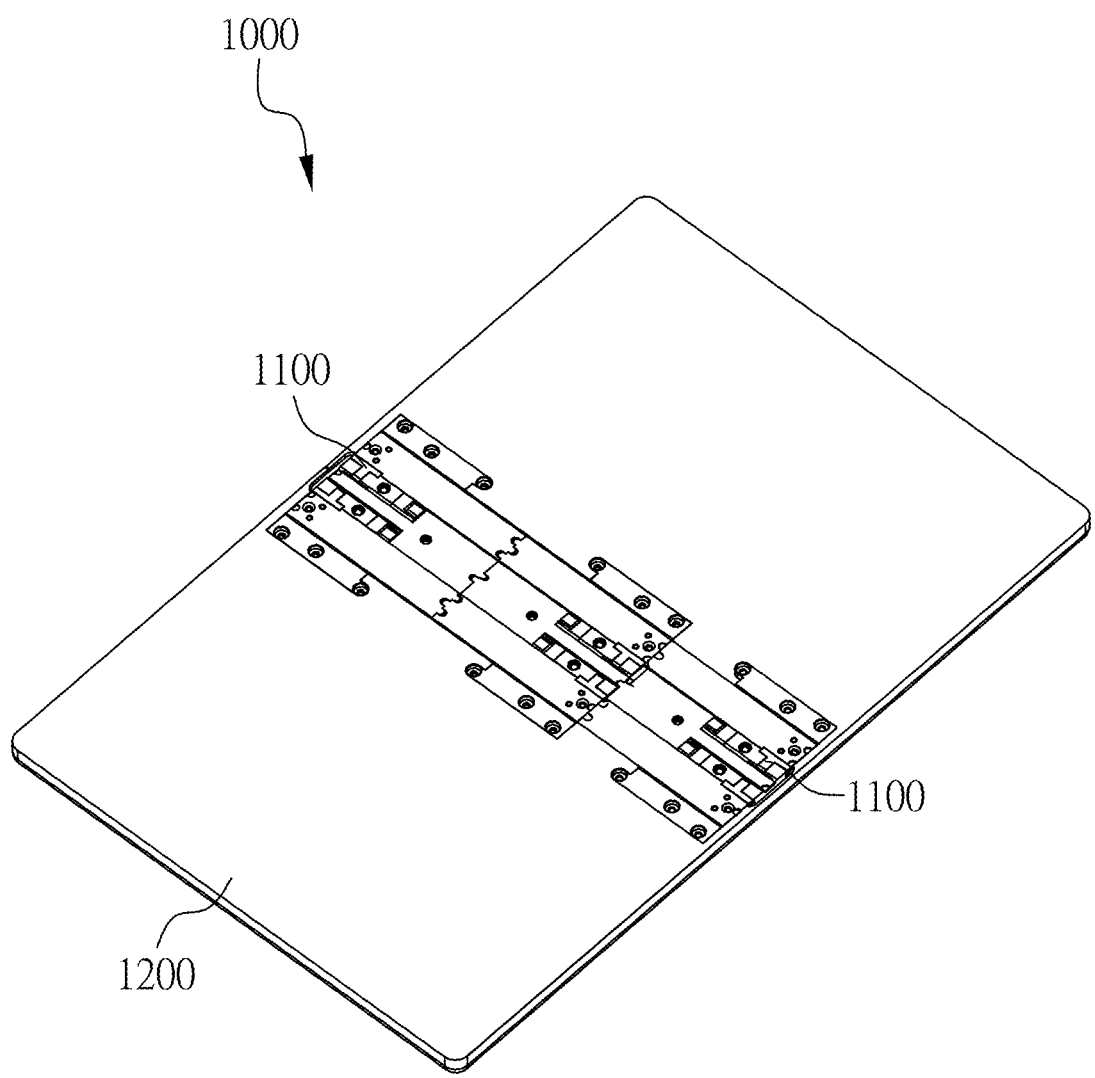
FIG. 2 is a perspective schematic view of the foldable electronic device in the unfolded status according to the present invention.
Figure 3:
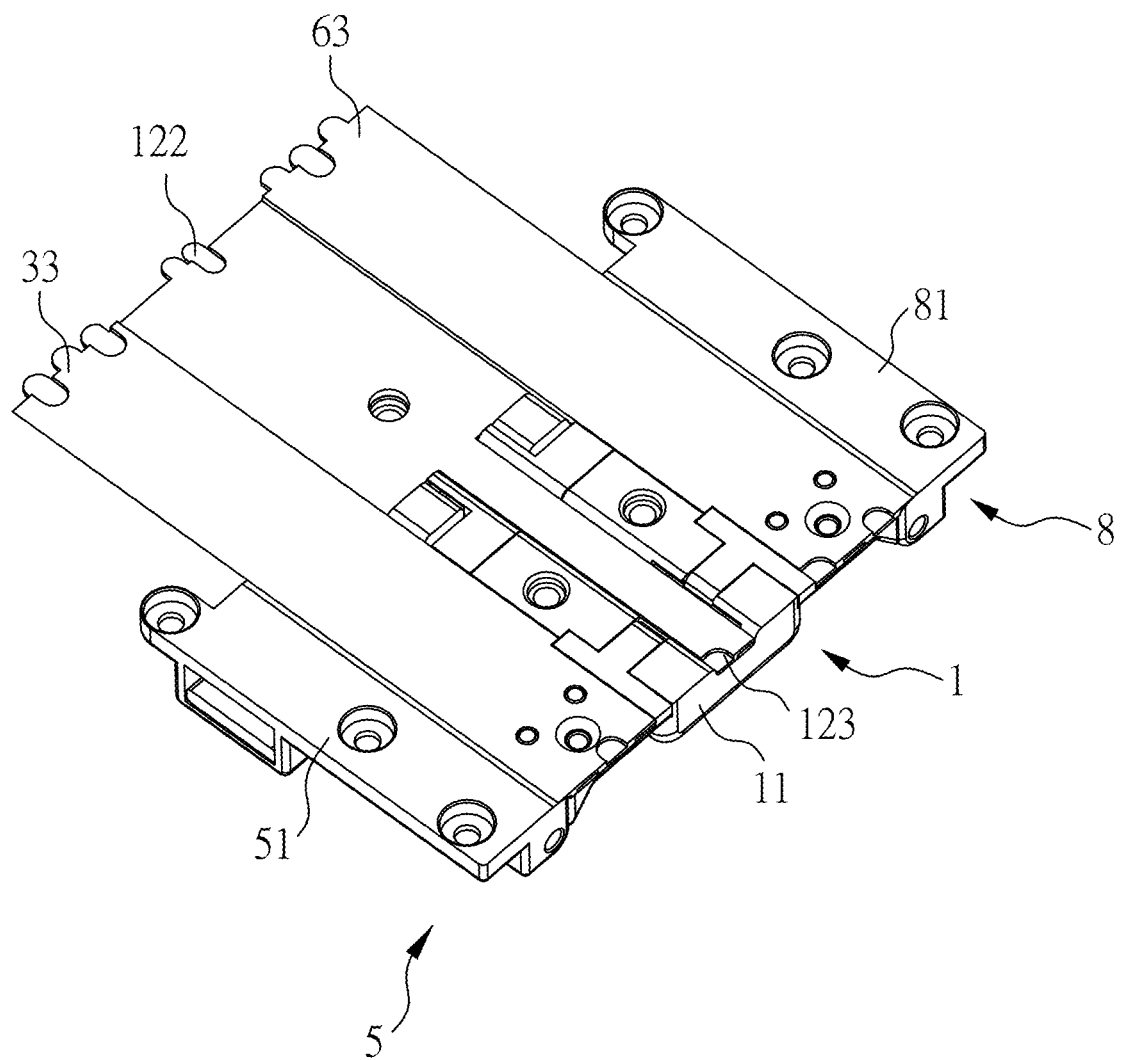
FIG. 3 is a schematic view of the foldable unit according to the present invention.
Figure 4:
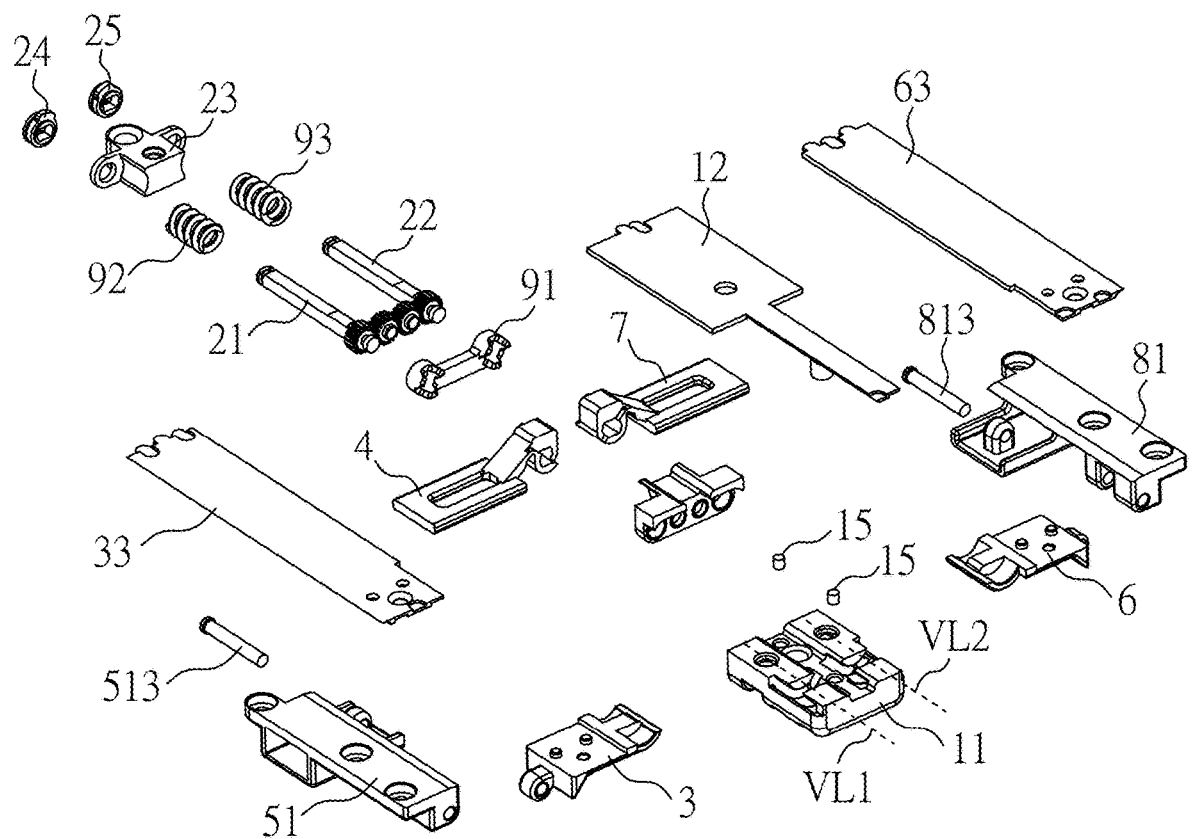
FIG. 4 is a partial exploded view of the foldable device according to the present invention.
Figure 5:
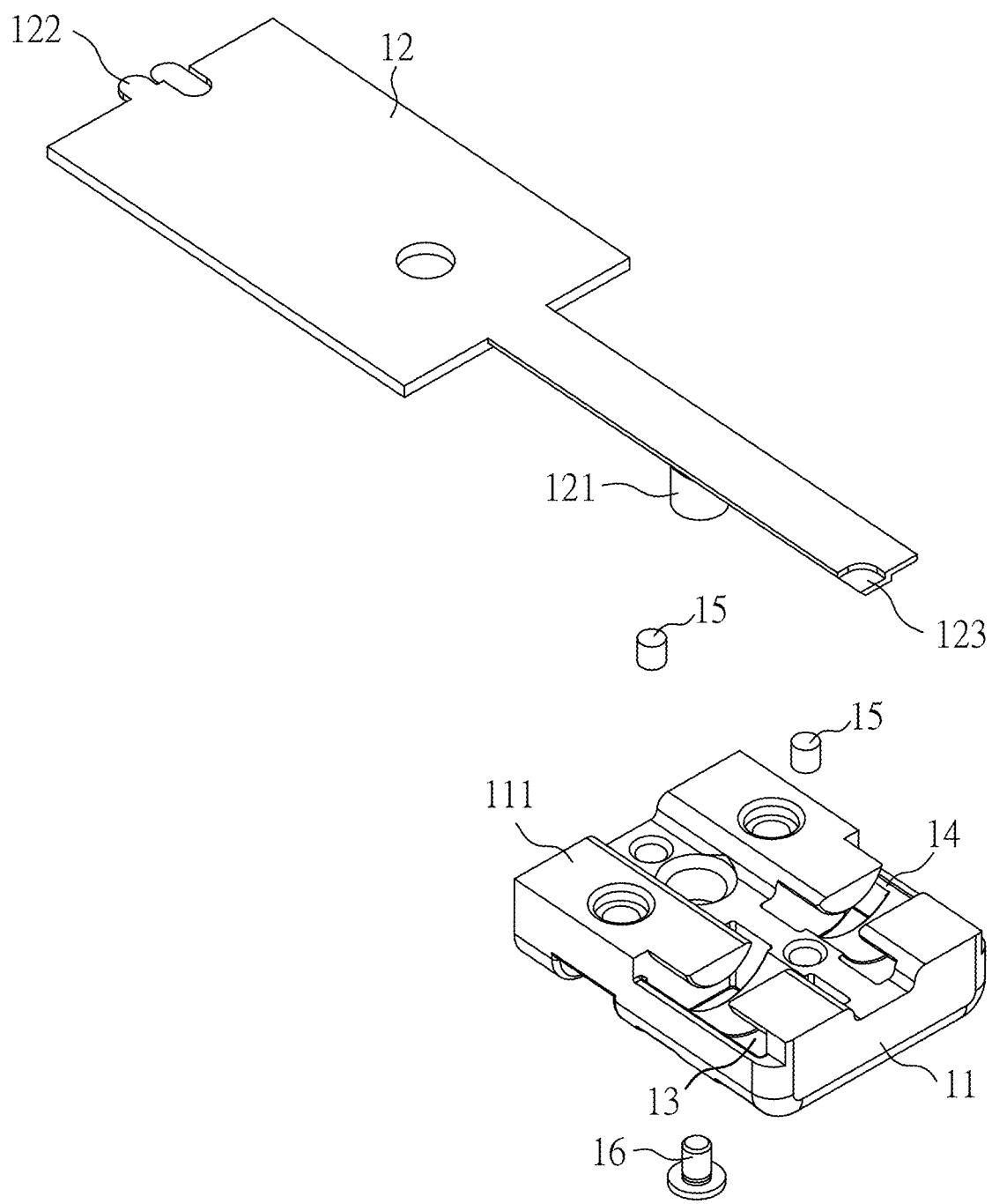
FIG. 5 is an exploded view of the central base according to the present invention.
Figure 6:
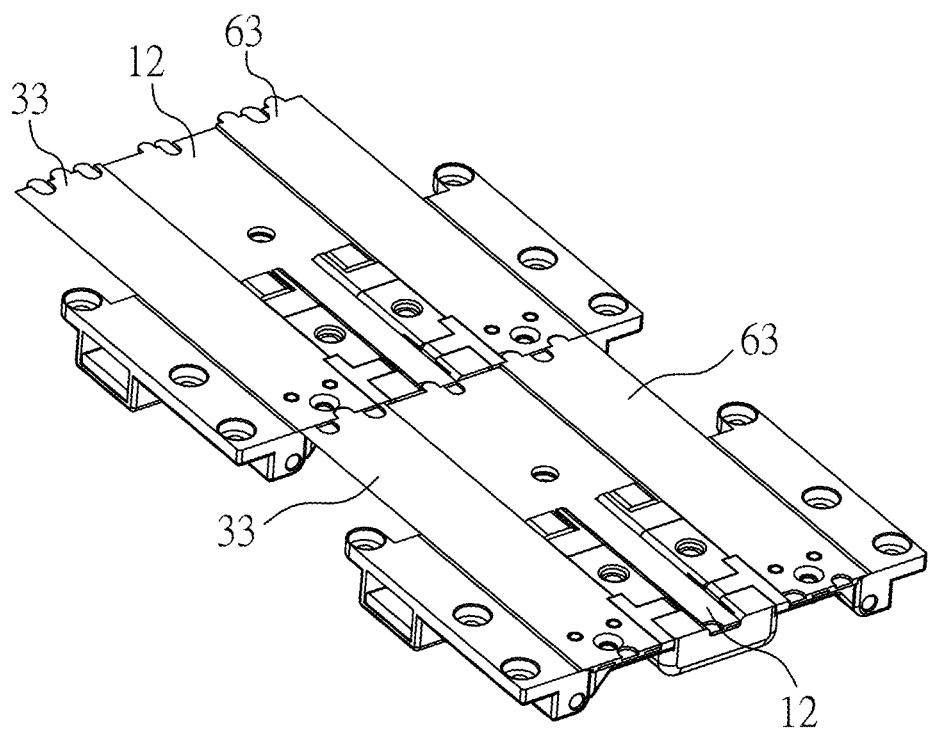
FIG. 6 is a schematic view of multiple connected foldable units according to the present invention.
Figure 7:
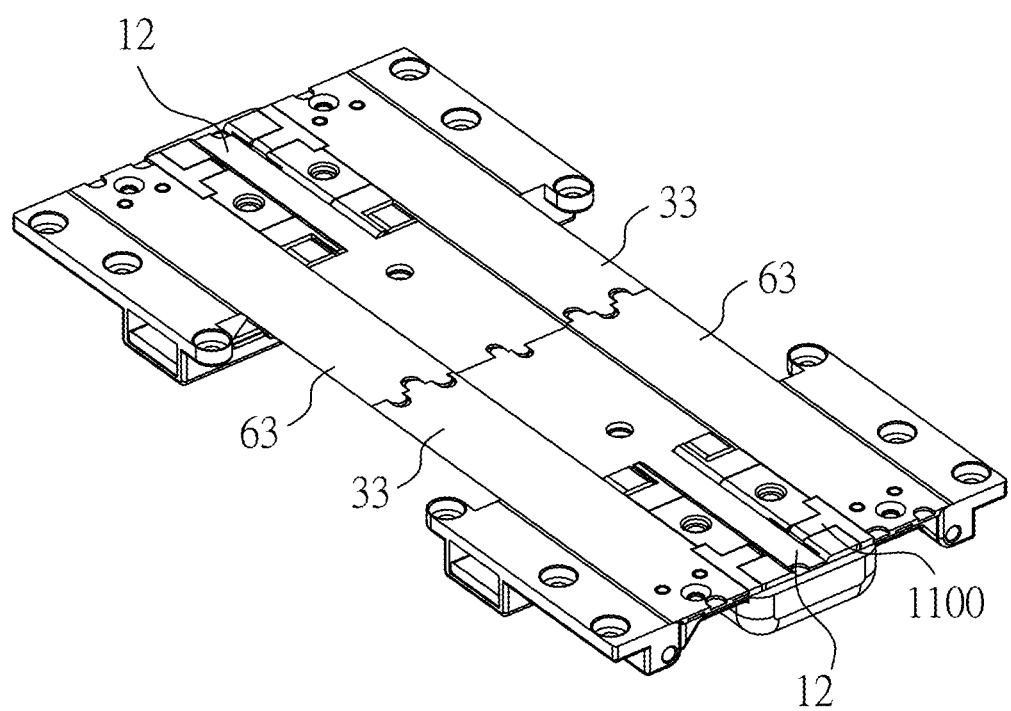
FIG. 7 is a schematic view of multiple connected foldable units according to the present invention.
Figure 8:
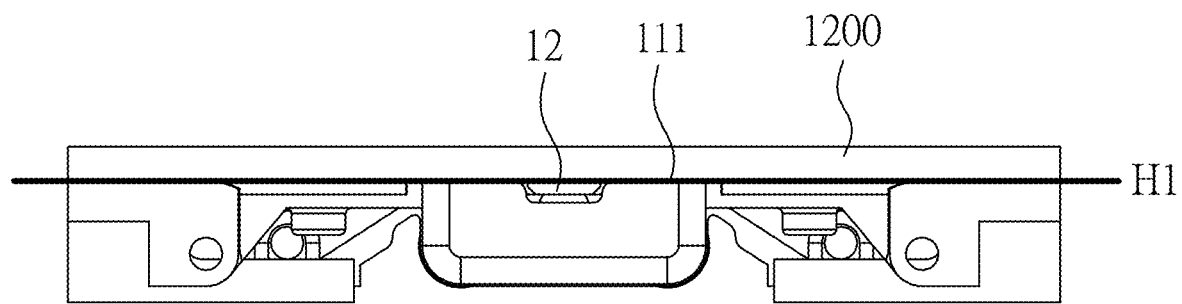
FIG. 8 is a side view of the foldable electronic device in the unfolded status according to the present invention.
Figure 9:
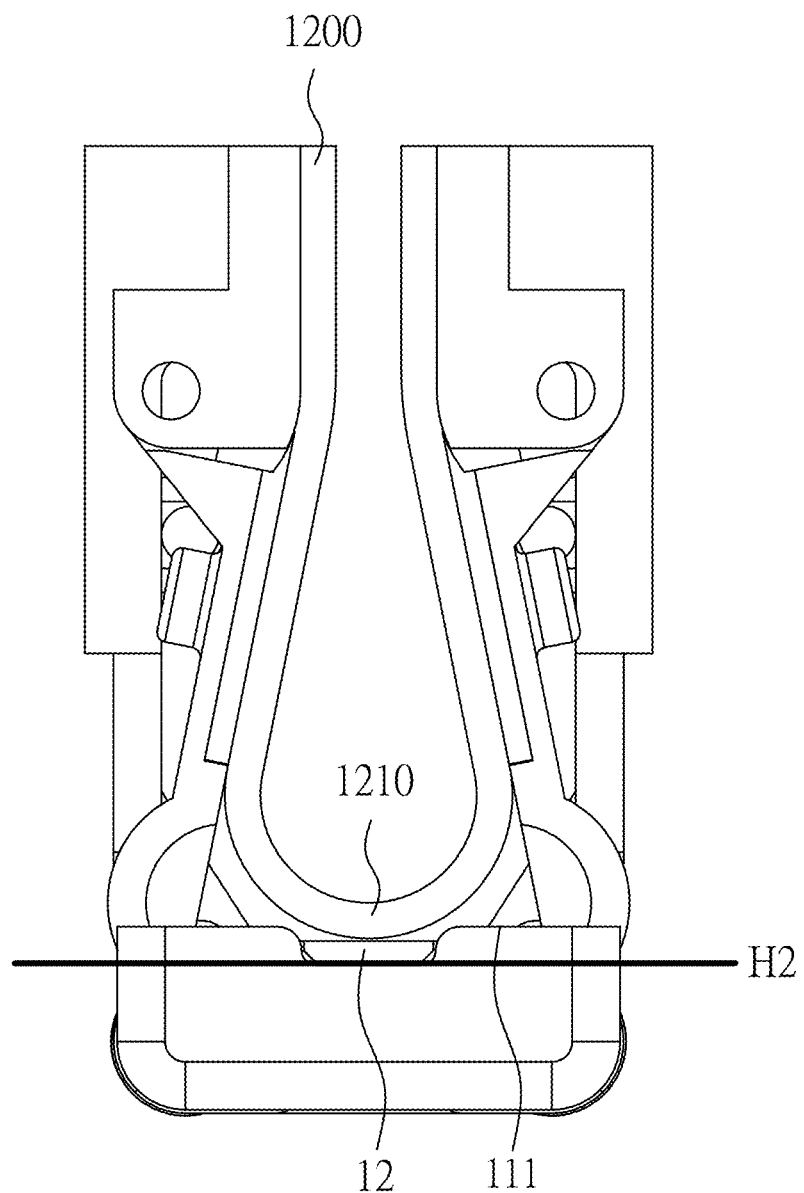
FIG. 9 is a side view of the foldable electronic device in the folded status according to the present invention.

Reference is made to FIG. 1 to FIG. 4. FIG. 1 and FIG. 2 are schematic views of the foldable electronic device 1000 in an unfolded status according to the present invention. FIG. 3 and FIG. 4 are a schematic view and an exploded view of the foldable unit 1100 according to the present invention. The foldable electronic device 1000 comprises a plurality of foldable units 1100 and a flexible screen 1200. Each of the foldable units 1100 comprises a central base 1, a hinge module 2, a first wing 3, a first driving element 4, a first panel body 5, a second wing 6, a second driving element 7, a second panel body 8, and an elastic module 9. Reference is made to FIGS. 5-9. FIG. 5 is an exploded view of the central base 1 of the present invention. FIG. 6 and FIG. 7 are schematic views of different connections of the foldable units 1100. FIG. 8 and FIG. 9 are side views of the foldable electronic device in the unfolded status and in the folded status respectively. The central base 1 includes a body portion 11, a lifting plate 12, a first arc-shaped groove 13, a second arc-shaped groove 14, two magnets 15 and a limit screw 16. The body portion 11 has an upper surface 111.

The lifting plate 12 includes a convex column 121, a head butting structure 122 and a tail butting structure 123. The convex column 121 may be embedded in the body portion 11. The lifting plates 12 of the adjacent foldable units 1100 may be connected to each other by the head butting structure 122 and the tail butting structure 123. Specifically, if the adjacent folding unit 1100 is arranged in the same direction, the tail butting structure 123 of one of the lifting plates 12 is connected to the head butting structure 122 of the another foldable unit 1100, as shown in FIG. 6.

If the adjacent foldable units 1100 are arranged in opposite directions, the head butting structures 122 of the lifting plates 12 of the two foldable units 1100 are connected to each other, as shown in FIG. 7. In other embodiments, the aforementioned two head butting structures 122 may be changed to two tail butting structures.

The lifting plate 12 is movably disposed on the body portion 11, and is movable between a highest position H1 (as shown in FIG. 8) and a lowest position H2 (as shown in FIG. 9). Specifically, when the first panel body 5 and the second panel body 8 are in the unfolded status, the first driving element 4 and the second driving element 7 push the lifting plate 12 to the highest position H1, so that the lifting plate 12 is distant from the body portion 11 to be substantially coplanar with the upper surface 111. When the first panel body 5 and the second panel body 8 are in the folded status, the magnet 15 magnetically attracts the lifting plate 12 to make the lifting plate 12 descend to the lowest position H2 and retract relative to the upper surface 111.

The first arc-shaped slot 13 and the second arc-shaped slot 14 are formed opposite to each other on the body portion 11. The first arc-shaped groove 13 defines a first virtual axis VL1. The second arc-shaped slot 14 defines a second virtual axis VL2. The limit screw 16 penetrates through the body portion 11 to be screwed into the convex column 121 of the lifting plate 12.

Figure 10:
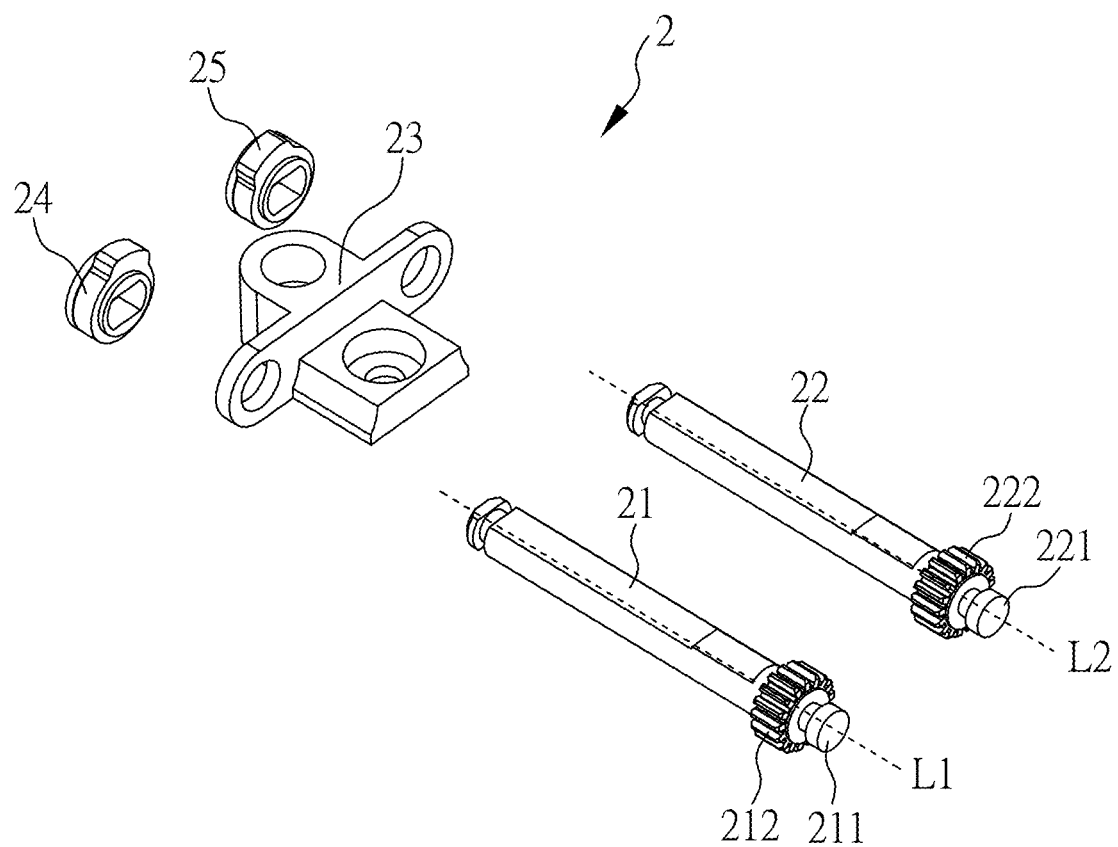
FIG. 10 is an exploded view of the hinge module according to the present invention.
Figure 11:
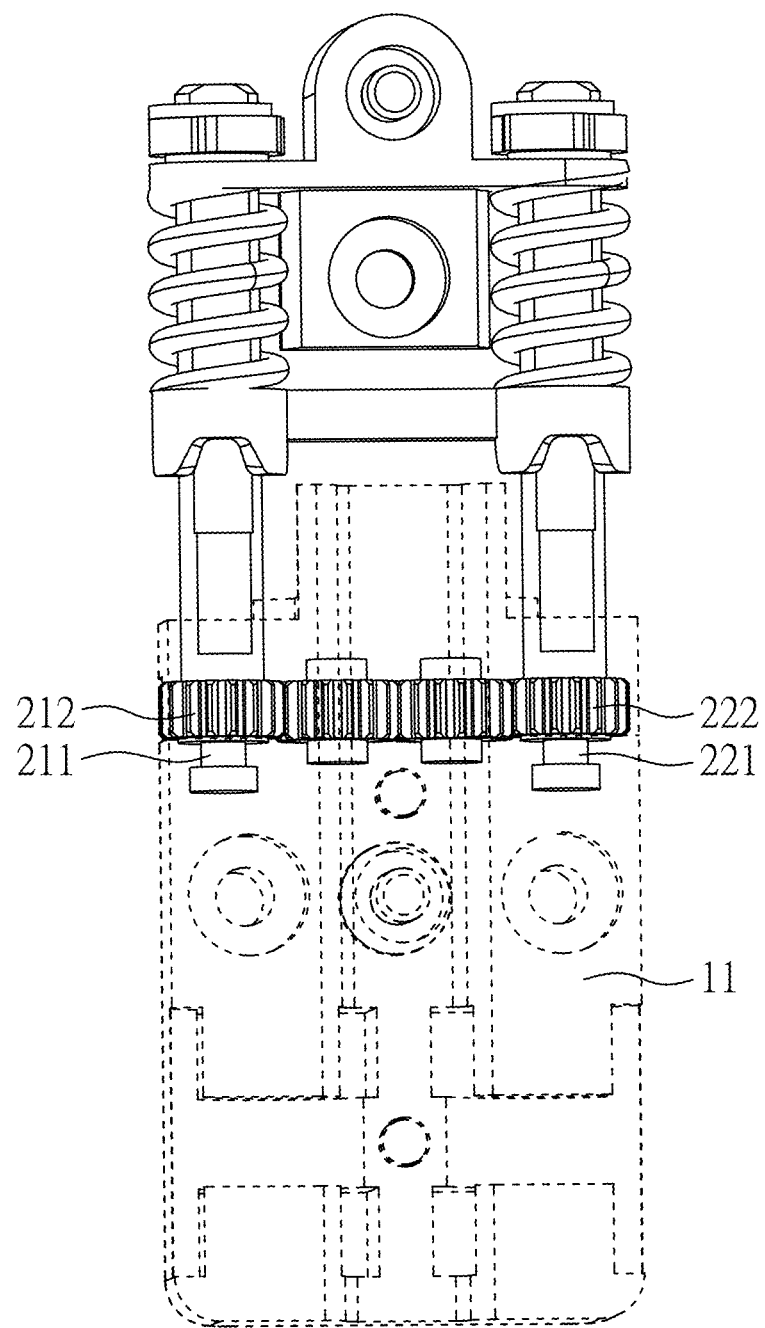
FIG. 11 is a partial perspective view of the hinge module according to the present invention.

Referring to FIG. 10, the exploded view of the hinge module 2 according to the present invention is illustrated. The hinge module 2 includes a first shaft 21, a second shaft 22, a fixing base 23, a first washer 24 and a second washer 25. The first shaft 21 and the second shaft 22 respectively penetrate through the body portion 11 and capable of rotating synchronously and reversely. To be more specific, referring to FIG. 11, the first shaft 21 has a first head portion 211 and a first gear portion 212, and the second shaft 22 has a second head portion 221 and a second gear portion 222. The first head portion 211 and the second head portion 221 are disposed on the body portion 11. Two gears that are engaged with each other are disposed between the first gear portion 212 and the second gear portion 222. The two gears are engaged with the first gear portion 212 and the second gear portion 222 respectively to make the first gear portion 212 and the second gear portion 222 rotate simultaneously. As a result, the first shaft 21 and the second shaft 22 can rotate reversely and synchronously.

The first shaft 21 extends along a first axis L1, and the first axis L1 is parallel to the first virtual axis VL1. The second shaft 22 extends along a second axis L2, and the second axis L2 is parallel to the second virtual axis VL2. The first shaft 21 and the second shaft 22 are non-circular shafts.

The fixing seat 23 is sleeved on the first shaft 21 and the second shaft 22. The first washer 24 is sleeved on the first shaft 21, and the second washer 25 is sleeved on the second shaft 22 to fix the first shaft 21 and the second shaft 22 to the fixing base 23.

Figure 12:
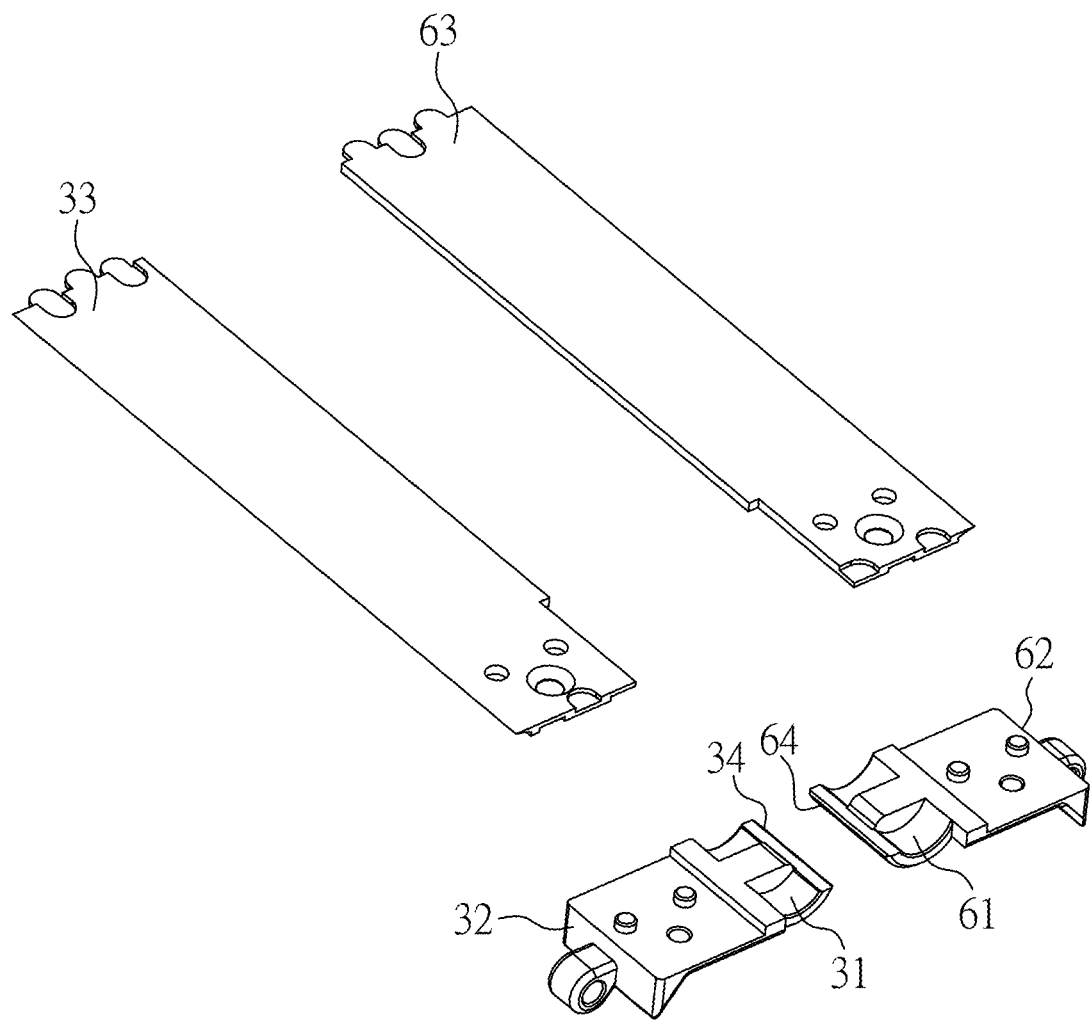
FIG. 12 is an exploded view of the first wing and the second wing according to the present invention.
Figure 13:
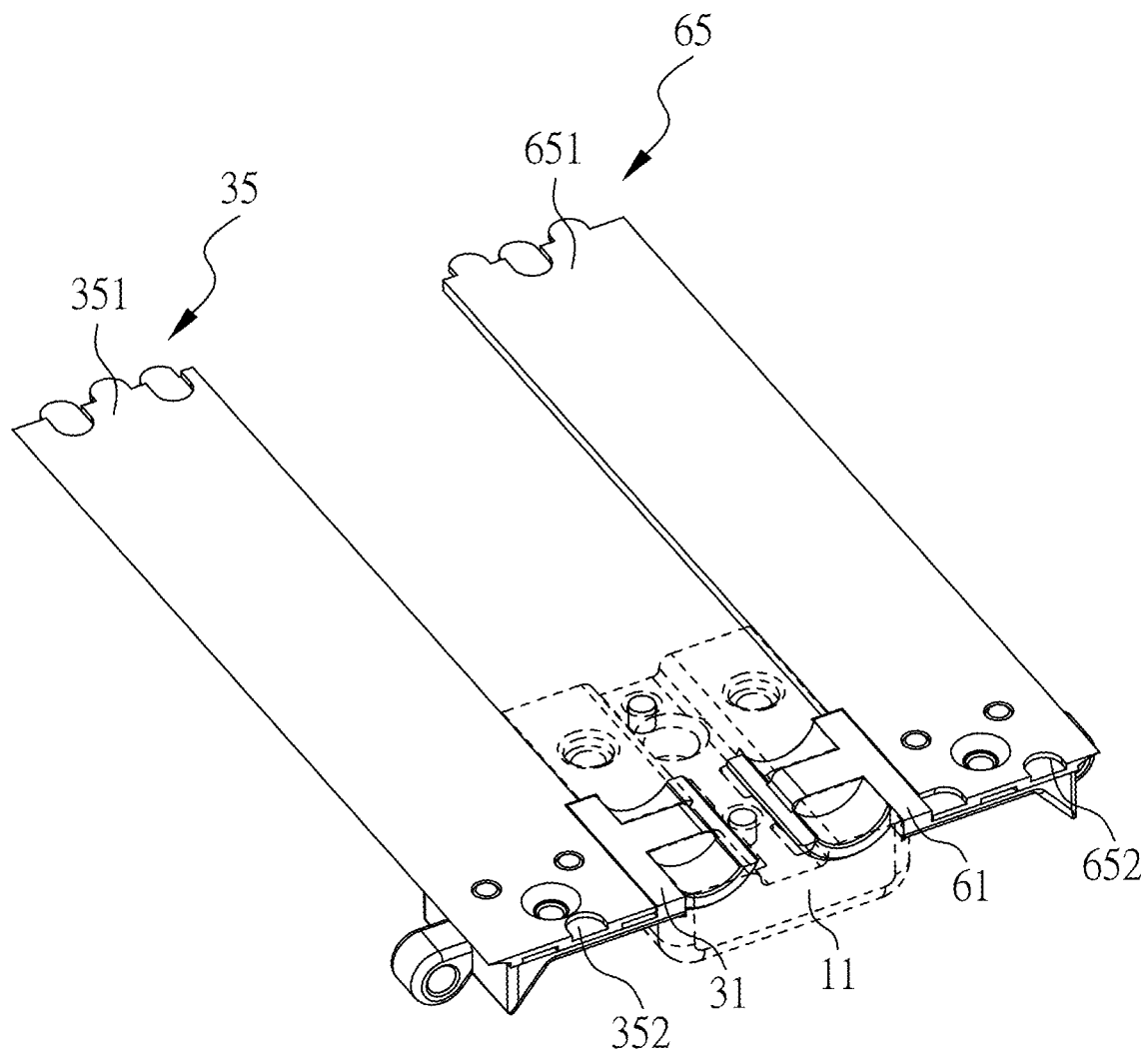
FIG. 13 is a schematic view of the first wing and the second wing disposed on the body portion according to the present invention.

Please refer to FIG. 12 and FIG. 13. FIG. 12 is the exploded view of the first wing 3 and the second wing 6, and FIG. 13 is a schematic view of the first wing 3 and the second wing 6 disposed on the body portion 11. The first wing 3 rotates relative to the body portion 11 about the first virtual axis VL1, and includes a first arc-shaped part 31, a first stopping surface 32, a first supporting plate 33, a first edge 34 and a butting structure 35. The first arc-shaped part 31 is slidably disposed in the first arc-shaped groove 13, so that the first wing 3 is able to pivot relative to the body portion 11. The butting structure 35 is formed on the first supporting plate 33, and includes a first head butting part 351 and a first tail butting part 352. The second wing 6 rotates relative to the body portion 11 about the second virtual axis VL2, and includes a second arc-shaped part 61, a second stopping surface 62, a second supporting plate 63, a second edge 64 and a butting structure 65. The second arc-shaped part 61 is slidably disposed in the second arc-shaped groove 14, so that the second wing 6 is able to pivot relative to the body portion 11. The butting structure 65 is formed on the second supporting plate 63, and has a second head butting part 651 and a second tail butting part 652.

The adjacent first wing 3 and the second wing 6 are connected to each other by the butting structure 35 and the butting structure 65 respectively. To be more specific, if the foldable electronic device 1000 comprises two foldable units 1100, the foldable units 1100 are usually arranged in opposite directions. The two foldable units 1100 are connected by the butting structure 35 and the butting structure 65. The first head butting part 351 and the second head butting part 651 of one of the foldable units 1100 are respectively connected to the second head butting part 651 and the first head butting part 351 of the other one of the foldable units 1100 (as shown in FIG. 1 and FIG. 7). In addition, the unconnected first tail butting part 352 and second tail butting part 652 of the two foldable units 1100 may be disposed abutting against two sides of the flexible screen 1200.

For another example, as shown in FIG. 2 and FIG. 6, if the foldable electronic device 1000 comprises three foldable units 1100, the two farthest foldable units 1100 are arranged in opposite directions. In other words, the foldable unit 1100 in the middle is arranged in the same direction as one of the other two foldable units 1100. The first tail butting part 352 of the foldable unit 1100 located in the middle is connected to the first tail butting part 351 of the foldable unit 1100 that is arranged in the same direction, and the second tail butting part 652 of the foldable unit 1100 located in the middle is connected to the second head butting part 651 of the foldable unit 1100 that is arranged in the same direction.

Figure 14:
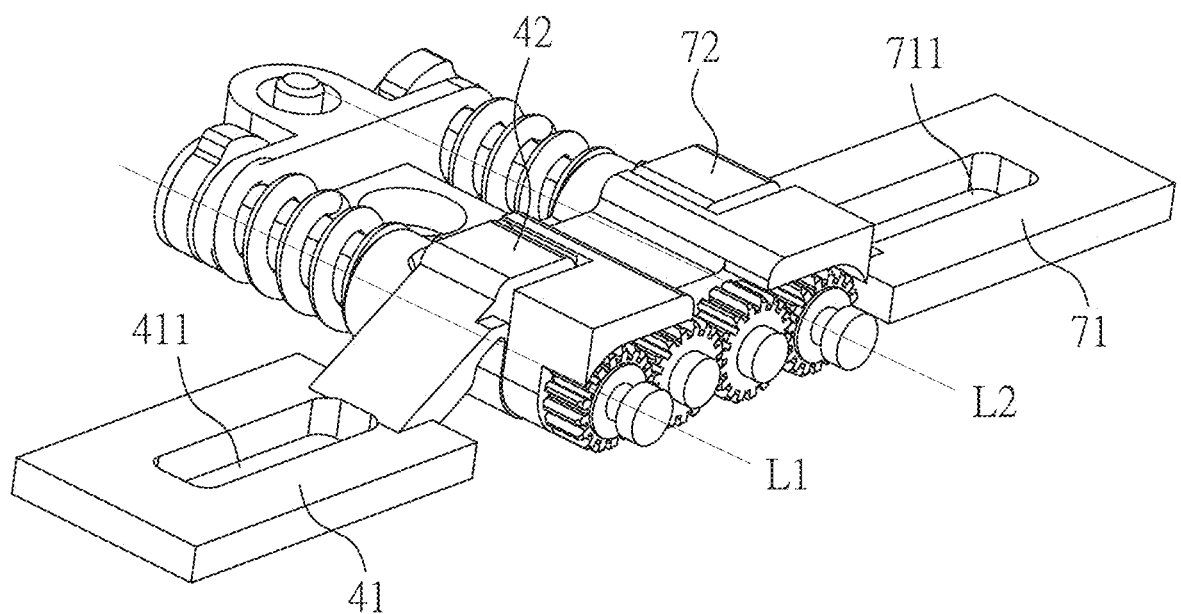
FIG. 14 is a partial schematic view of the foldable electronic device according to the present invention.
Figure 15:
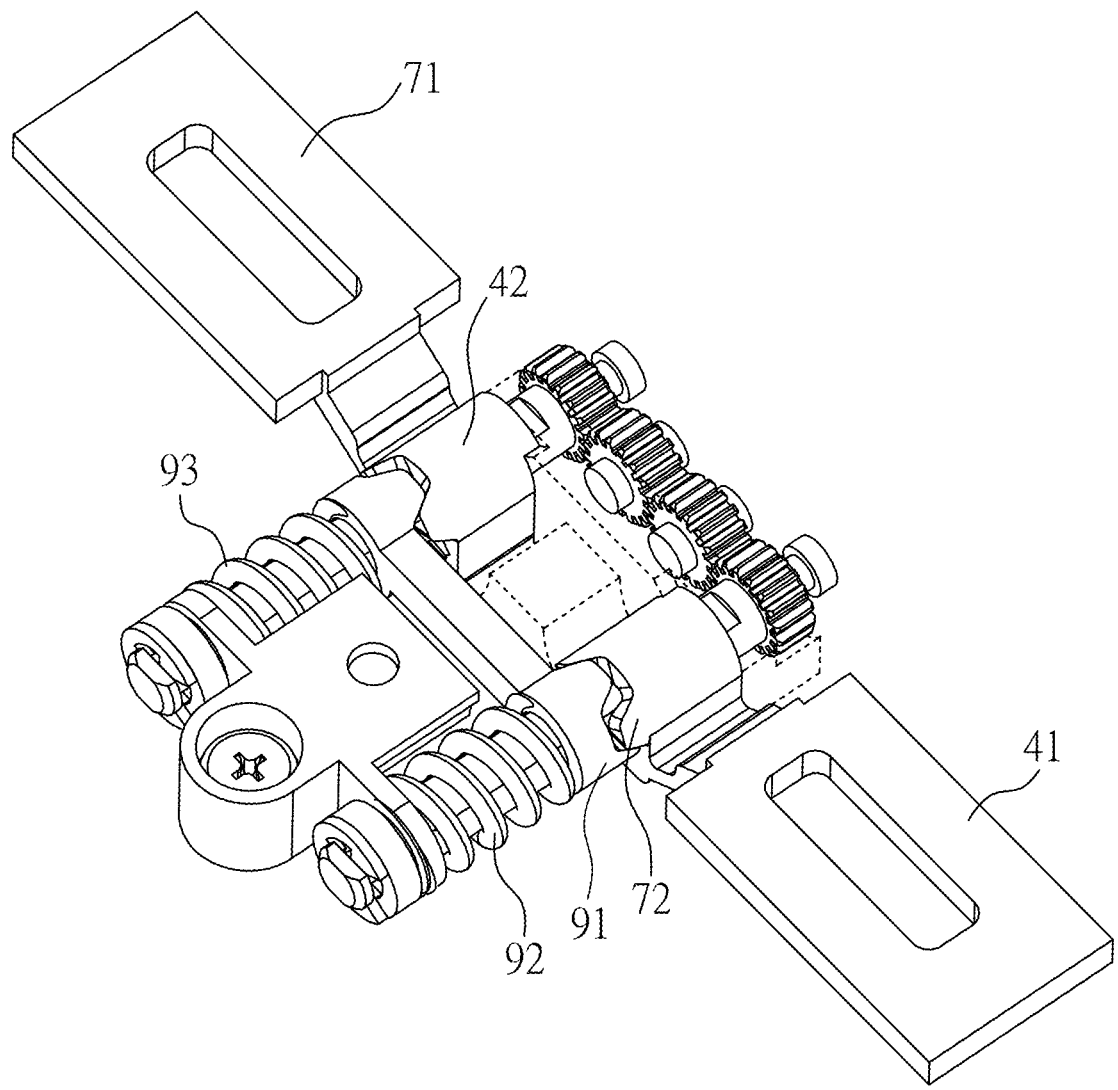
FIG. 15 is a partial schematic view of the foldable electronic device according to the present invention.
Figure 16:
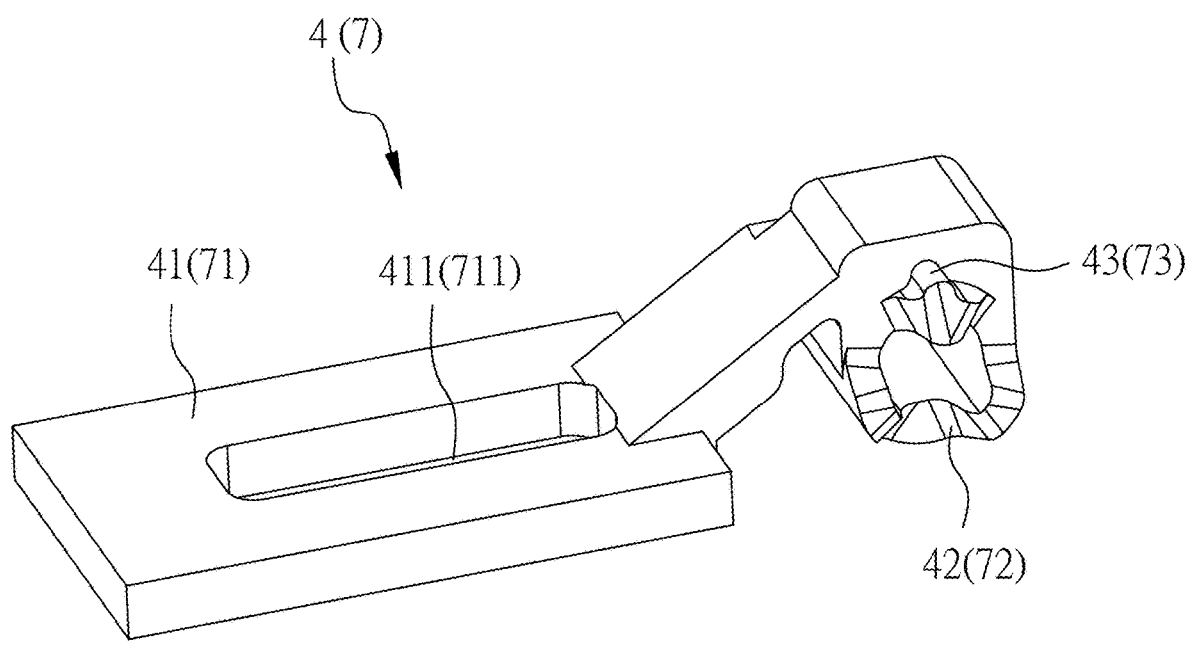
FIG. 16 is a schematic view of the first driving element and the second driving element according to the present invention.

Reference is made to FIGS. 14 to 16. FIG. 14 and FIG. 15 are different partial schematic views of the foldable electronic device 1000 according to the present invention. FIG. 14 is a schematic view of the first driving element 4 and the second driving element 7 (the second driving element 7 and the first driving element 4 are symmetrical structures, and the elements of the second driving element 7 are labeled in brackets in FIG. 16). The first driving element 4 is sleeved on the first shaft 21 and synchronously rotates with the first shaft 21 about the first axis L1. The first driving element 4 includes a first extending plate 41, a first driving cam 42 and a first protruding portion 43. The first extending plate 41 has a first penetrating slot 411. The first driving cam 42 is slidably sleeved on the first shaft 21 along the first axis L1, and the first driving cam 42 has a non-circular sleeve hole for matching with the first shaft 21.

The second driving element 7 is sleeved on the second shaft 22 and synchronously rotates with the second shaft 22 about the second axis L2. The second driving element 7 includes a second extending plate 71, a second driving cam 72 and a second protruding portion 73. The second extending plate 71 has a second penetrating slot 711. The second driving cam 72 is slidably sleeved on the second shaft 22 along the second axis L1, and the second driving cam 72 has a non-circular sleeve hole for matching with the second shaft 22.

When the first panel body 5 and the second panel body 8 are in the unfolded status, the first stopping surface 32 abuts against the first bearing element 51, and the second stopping surface 62 abuts against the second bearing element 81. The first edge 34, the second edge 64, the first washer 24, the second washer 25, the first protruding portion 43 and the second protruding portion 73 collectively push the lifting plate 12 to the highest position H1. In this time, the lifting plate 12 is distant from the body portion 11 and is substantially coplanar with the upper surface 111.

Figure 17:
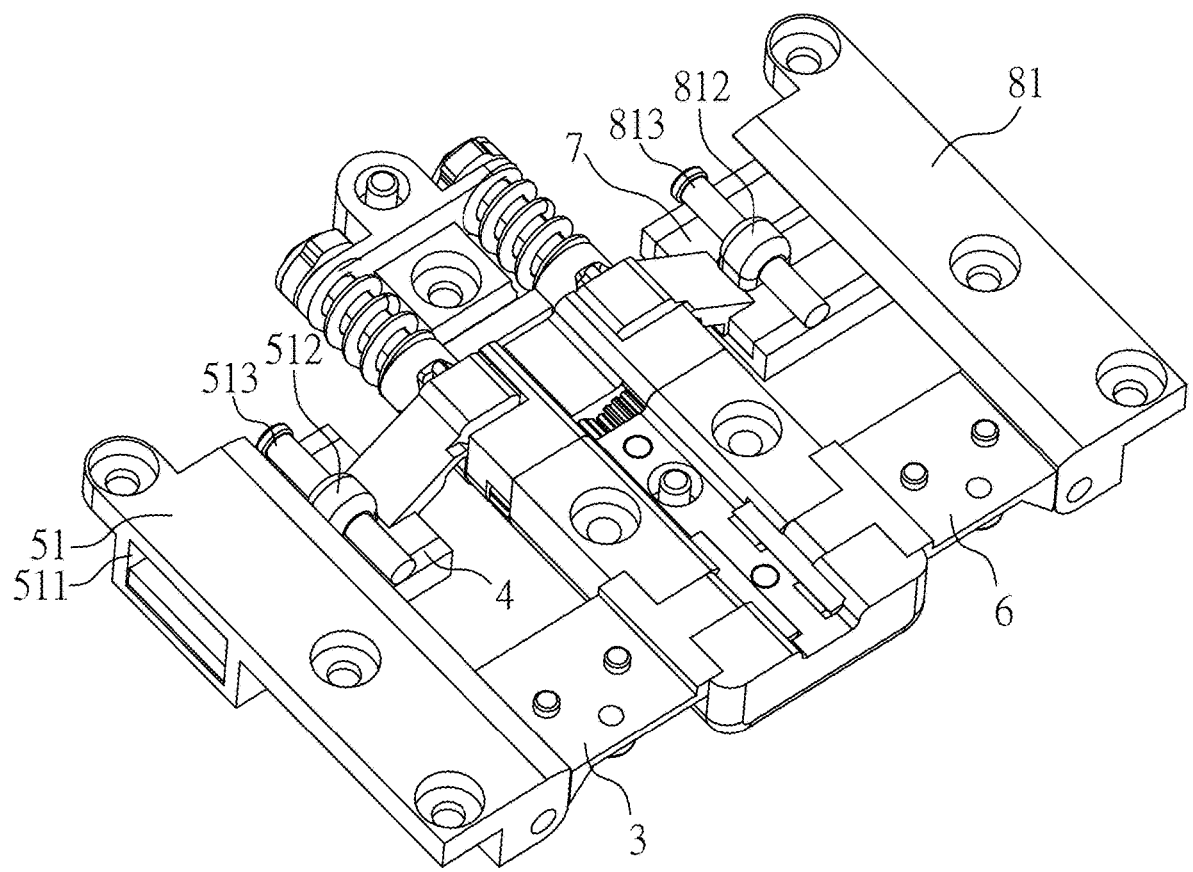
FIG. 17 is a partial schematic view of the foldable electronic device according to the present invention.
Figure 18:
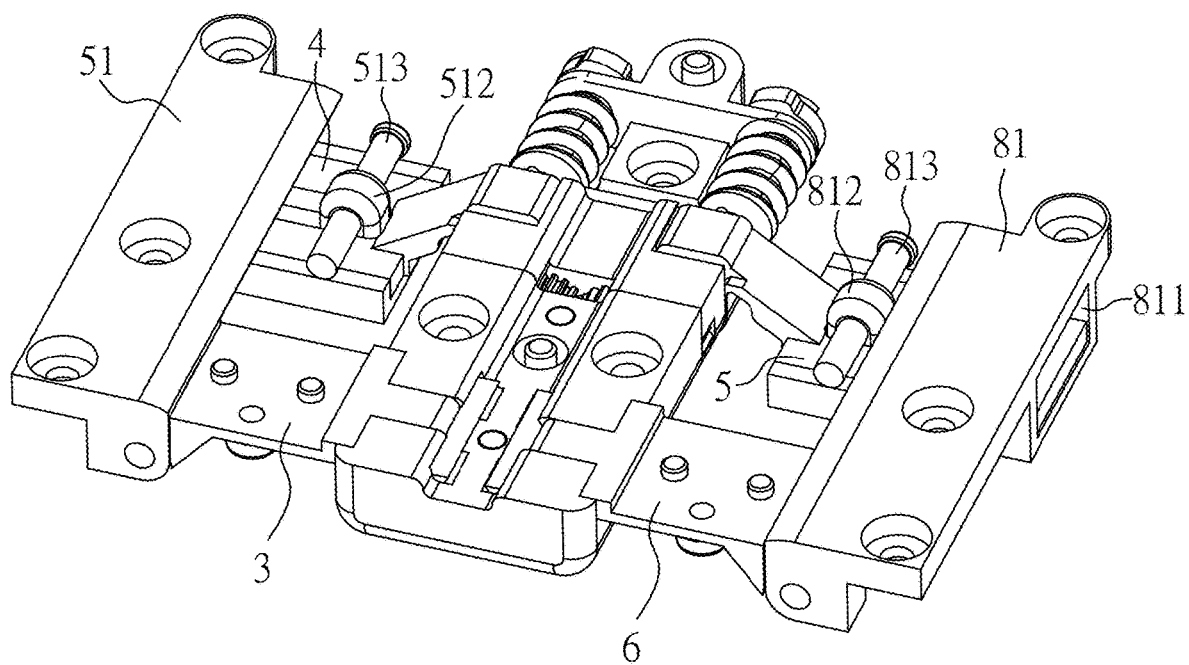
FIG. 18 is a partial schematic view of the foldable electronic device according to the present invention.
Figure 19:
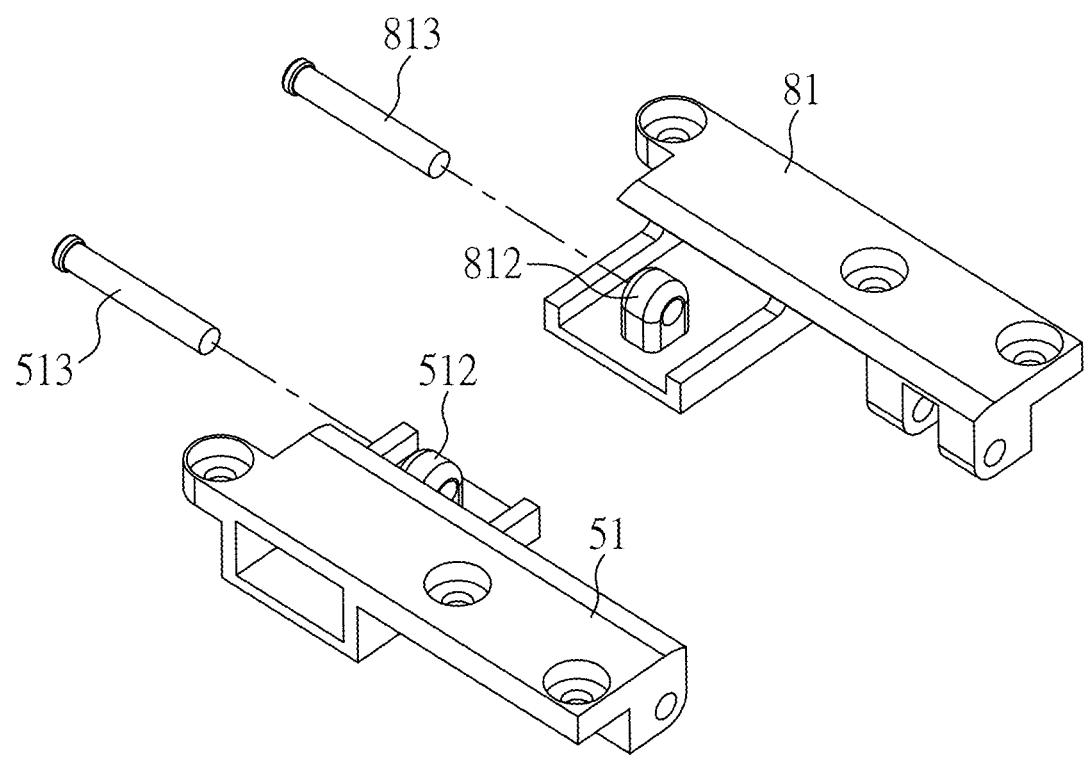
FIG. 19 is a schematic view of the first panel body and the second panel body according to the present invention.
Figure 20:
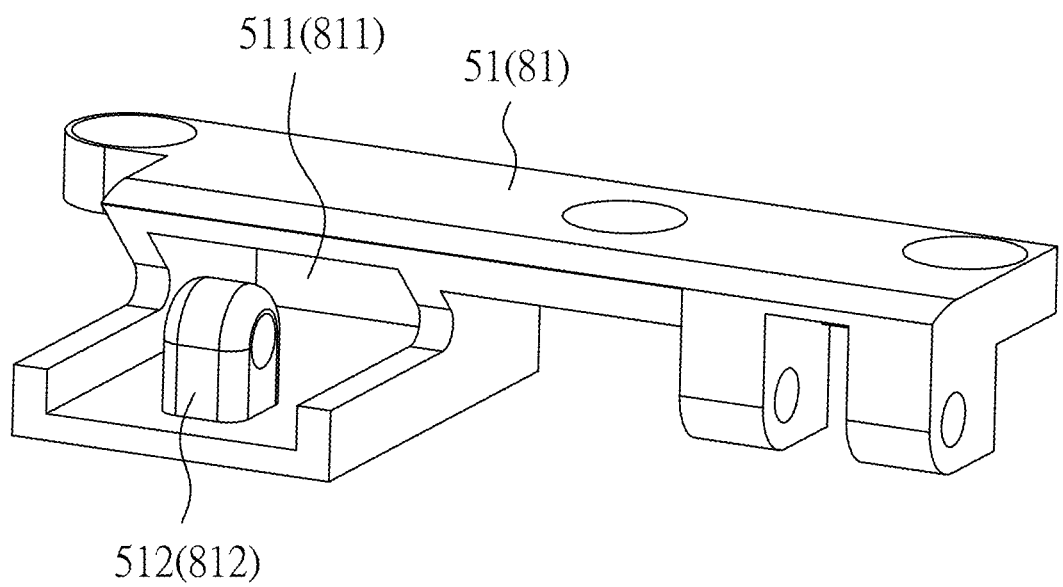
FIG. 20 is a schematic view of the first panel body and the second panel body according to the present invention.
Figure 21:
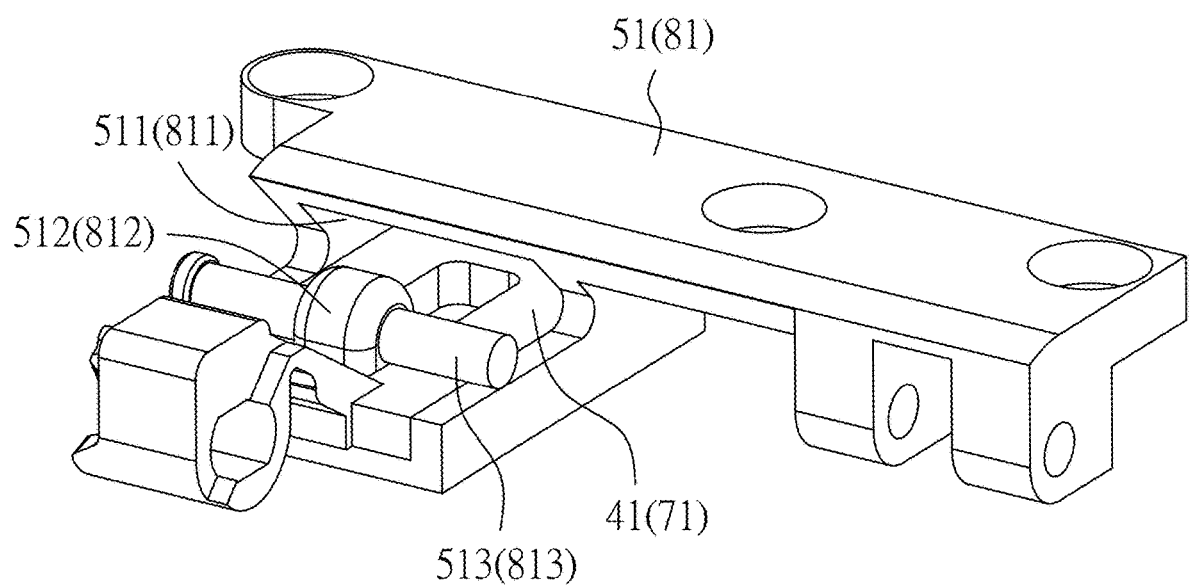
FIG. 21 is a schematic view of the first panel body and the second panel body according to the present invention.

Please refer to FIGS. 17 to 21. FIG. 17 and FIG. 18 are different partial schematic views of the foldable electronic device 1000 according to the present invention. FIGS. 19 to 21 are schematic views of the first panel body 5 and the second panel body 8. The first panel body 5 includes a first bearing element 51, which is pivoted to the first wing 3 and linearly slidable relative to the first driving element 4. The first supporting plate 33 is slidably adjacent to the first bearing element 51. The first bearing element 51 has a first sliding groove 511, a first pivot seat 512 and a first latch 513. The first sliding groove 511 extends substantially perpendicular to the first axis L1. The first sliding groove 511 may accommodate the first extending plate 41. The first pivot seat 512 penetrates through the first penetrating slot 411 of the first extending plate 41. The first latch 513 penetrates through the first pivot seat 512 to slidably accommodate the first extending plate 41 in the first bearing element 51.

The second panel body 8 is disposed opposite to the first panel body and includes a second bearing element 81. The second bearing element 81 is pivoted to the second wing 6 and linearly slidable relative to the second driving element 7. The second supporting plate 63 is slidably adjacent to the second bearing element 81. The first bearing element 33 and the second bearing element 63 are configured for the flexible screen 1200 to lean on. The second bearing element 81 has a second sliding groove 811, a second pivot seat 812 and a second latch 813. The second sliding groove 811 extends substantially perpendicular to the second axis L2. The second sliding groove 811 may accommodate the second extending plate 71. The second pivot seat 812 penetrates through the second penetrating slot 711 of the second extending plate 71. The second latch 813 penetrates through the second pivot seat 812 to slidably accommodate the second extending plate 71 in the second bearing element 81.

When the first panel body 5 and the first panel body 8 are in the folded status, an included angle is formed between the first stopping surface 32 and the first bearing element 51, and an included angle is formed between the second stopping surface 62 and the second bearing element 81, as shown in FIG. 9. The first edge 34, the second edge 64, the first washer 24, the second washer 25, the first protruding portion 43 and the second protruding portion 73 do not jointly push the lifting plate 12 up. The magnetic force of the magnet 15 magnetically attracts the lifting plate 12 to make the lifting plate 12 descend to the lowest position H2 to retract and attach to the body portion 11.

Figure 22:
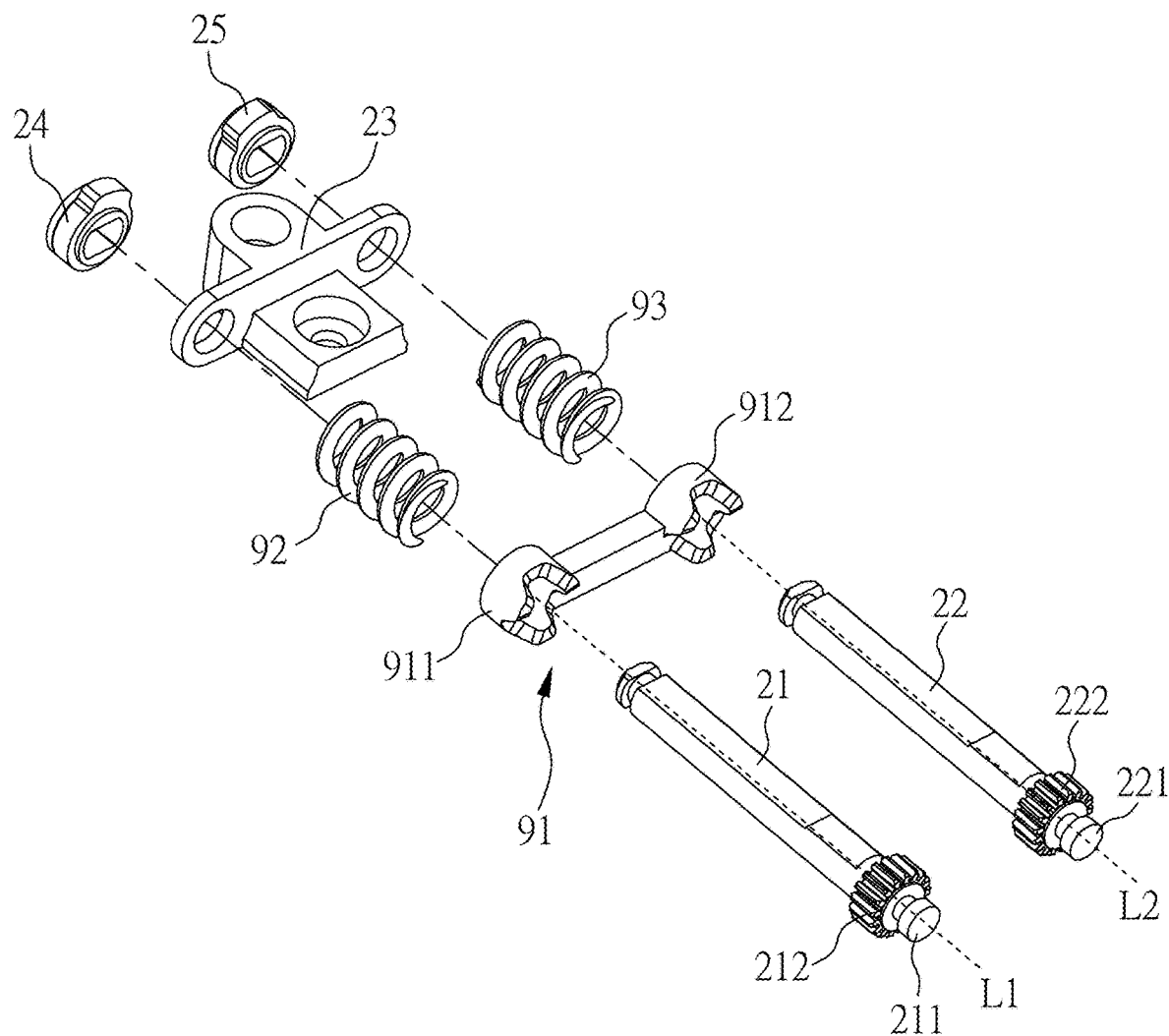
FIG. 22 is an exploded view of the elastic module and the hinge module according to the present invention.

Please refer to FIGS. 15 and 22. FIG. 22 is the exploded view of the hinge module 9 and the hinge module 2. The elastic module 9 includes a push element 91, a first elastic element 92 and a second elastic element 93. The push element 91 has a first driven cam 911 and a second driven cam 912. The first driven cam 911 and the second driven cam 912 respectively have a circular sleeve hole for being sleeved on the first shaft 21 and the second shaft 22 respectively. The push element 91 is movably engaged with the first driving element 4 and the second driving element 7, as shown in FIG. 15.

The first elastic element 92 is sleeved on the first shaft 21 and abuts against the push element 91. The first elastic element 92 is disposed between the first driven cam 911 and the fixing base 23. The second elastic element 93 is disposed between the first driven cam 912 and the fixing base 23, and is sleeved on the second shaft 22 and abuts against the push element 91. The first driving cam 42 is able to drive the first driven cam 911, and the second driving cam 72 is able to drive the second driven cam 912. In other words, the contour of the first driven cam 911 matches the contour of the first driving cam 42, and the contour of the second driven cam 912 matches the contour of the second driving cam 72.

When the first panel body 5 and the second panel body 8 are in a half-folded status, the first driving cam 42 and the second driving cam 72 abut against the first driven cam 911 and the second driven cam 912 to compress the first elastic element 92 and the second elastic element 93. When the first panel body 5 and the second panel body 8 are in the unfolded status or the folded status, the first elastic element 92 and the second elastic element 93 are correspondingly released.

Please refer to FIG. 1, FIG. 2, FIG. 8 and FIG. 9. The flexible screen 1200 is disposed on the first panel body 5, the first wing 3, the second panel body 8 and the second wing 6. The flexible screen 1200 comprises a bendable area 1210. The foldable units 1100 are arranged along the bendable area 1210, the adjacent foldable units 1100 are connected to each other by the corresponding first supporting plate 33 and the second supporting plate 63. When a number of the foldable units 1100 are even, the foldable units 1100 are symmetrically arranged perpendicular to a center line of the bendable area 1210.

The first panel body 5 and the second panel body 8 are convertible between the unfolded status and the folded status. When the first panel body 5 and the second panel body 8 are in the unfolded status, the flexible screen 1200 is flattened, the lifting plate 12 is at the highest position H1 which is distant from the body portion 11, so that the first wing 3, the second wing 6 and the lifting plate 12 collectively support the bendable area 1210. When the first panel body 5 and the second panel body 8 are in the folded status, the flexible screen 1200 is bent at the bendable area 1210, the lifting plate 12 descends to the lowest position H2, and the first wing 3, the second wing 6 and the lifting plate 12 collectively define an accommodating space for accommodating the bendable area 1210.

According to the above descriptions, the foldable electronic device may stabilize the flexible screen when the flexible screen is bent with multiple foldable units, and the number of the foldable units may be adjusted according to the size of the flexible screen. In addition, the driving element and the lifting plate may collectively support the bendable area of the flexible screen when the two panel bodies are in the unfolded status, and may form an accommodating space for accommodating the bendable area when the two panel bodies are in the folded status. Besides, in the present invention, the extending plate of the driving element is disposed in the sliding groove of the bearing element, and the pivot seat of the bearing element penetrates through the penetrating slot of the extending plate, and the latch of the bearing element penetrates through the pivot seat to slidably clamp the extending plate in the bearing element. When the first panel body and the second panel body transform between the unfolded status and the folded status, mutual sliding relationship shows between the first driving element and the first panel body, and between the second driving element and the second panel body.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A foldable electronic device, comprising:
a plurality of foldable units, each of the foldable units comprising:
    a central base including a body portion, a lifting plate, a first arc-shaped groove and a second arc-shaped groove, the first arc-shaped groove and the second arc-shaped groove being formed on the body portion and opposite to each other, and the lifting plate being movably disposed on the body portion and movable between a highest position and a lowest position;
    a hinge module including a first shaft and a second shaft, wherein the first shaft and the second shaft respectively penetrate through the body portion and capable of rotating synchronously and reversely;
    a first wing including a first arc-shaped part slidably disposed in the first arc-shaped groove so that the first wing is able to pivot relative to the body portion;
    a first driving element being sleeved on the first shaft and synchronously rotating with the first shaft;
    a first panel body including a first bearing element, the first bearing element being pivoted to the first wing and linearly slidable relative to the first driving element;
    a second wing including a second arc-shaped part slidably disposed in the second arc-shaped groove so that the second wing is able to pivot relative to the body portion;
    a second driving element being sleeved on the second shaft and synchronously rotating with the second shaft;
    a second panel body including a second bearing element, the second bearing element being pivoted to the second wing and linearly slidable relative to the second driving element; and an elastic module including a push element, a first elastic element, and a second elastic element, the push element being sleeved on the first shaft and the second shaft and movably engaged with the first driving element and the second driving element, the first elastic element being sleeved on the first shaft and abutting against the push element, and the second elastic element being sleeved on the second shaft and abutting against the push element; and a flexible screen being disposed on the first panel body, the first wing, the second panel body and the second wing of each of the foldable units, and comprising a bendable area;

wherein the first panel body and the second panel body are convertible between an unfolded status and a folded status, wherein when the first panel body and the second panel body are in the unfolded status, the flexible screen is flattened, the lifting plate is at the highest position so that the first wing, the second wing and the lifting plate collectively support the bendable area; and wherein when the first panel body and the second panel body are in the folded status, the flexible screen is bent at the bendable area, the lifting plate is at the lowest position, and the first wing, the second wing and the lifting plate collectively define an accommodating space for accommodating the bendable area.

2. The foldable electronic device as claimed in claim 1, wherein the foldable units are arranged along the bendable area, and the adjacent foldable units are connected to each other by the corresponding first wing and the second wing.

3. The foldable electronic device as claimed in claim 2, wherein the first wing and the second wing include a butting structure respectively, and the first wing and the second wing, adjacent to each other, are mutually connected by the butting structures.

4. The foldable electronic device as claimed in claim 3, wherein the first driving element includes a first extending plate, the first extending plate has a first penetrating slot, the first bearing element has a first sliding groove, a first pivot seat and a first latch, the first sliding groove is configured to accommodate the first extending plate, the first pivot seat penetrates through the first penetrating slot, and the first latch penetrates through the first pivot seat so that the first extending plate is slidably accommodated in the first bearing element; and wherein the second driving element includes a second extending plate, the second extending plate has a second penetrating slot, the second bearing element has a second sliding groove, a second pivot seat and a second latch, the second sliding groove is configured to accommodate the second extending plate, the second pivot seat penetrates through the second penetrating slot, and the second latch penetrates through the second pivot seat so that the second extending plate is slidably accommodated in the second bearing element.

5. The foldable electronic device as claimed in claim 4, wherein the first shaft extends along a first axis, the first shaft and the first driving element rotate synchronously about the first axis, the first arc-shaped groove defines a first virtual axis, the first wing rotates relative to the body portion about the first virtual axis, and the first axis is parallel to the first virtual axis; and wherein the second shaft extends along a second axis, the second shaft and the second driving element rotate synchronously about the second axis, the second arc-shaped groove defines a second virtual axis, the second wing rotates relative to the body portion about the second virtual axis, and the second axis is parallel to the second virtual axis.

6. The foldable electronic device as claimed in claim 5, wherein the hinge module further includes a fixing base sleeved on the first shaft and the second shaft, the push element has a first driven cam and a second driven cam which are sleeved on the first shaft and the second shaft respectively, the first elastic element is disposed between the first driven cam and the fixing base, and the second elastic element is disposed between the second driven cam and the fixing base.

7. The foldable electronic device as claimed in claim 6, wherein the first driving element includes a first driving cam which is slidably sleeved on the first shaft along the first axis and engages with the first driven cam, and the second driving element includes a second driving cam which is slidably sleeved on the second shaft along the second axis and engages with the second driven cam, and wherein when the first panel body and the second panel body are in a half-folded status, the first driving cam and the second driving cam abut against the first driven cam and the second driven cam to compress the first elastic element and the second elastic element respectively, and when the first panel body and the second panel body are in the unfolded status or the folded status, the first elastic element and the second elastic element are correspondingly released.

8. The foldable electronic device as claimed in claim 7, wherein the first wing includes a first stopping surface, the second wing includes a second stopping surface, and wherein when the first panel body and the second panel body are in the unfolded status, the first stopping surface abuts against the first bearing element and the second stopping surface abuts against the second bearing element, and when the first panel body and the second panel body are in the folded status, an included angle forms between the first stopping surface and the first bearing element, and between the second stopping surface and the second bearing element respectively.

9. The foldable electronic device as claimed in claim 8, wherein the first wing includes a first supporting plate slidably adjacent to the first bearing element, the second wing includes a second supporting plate slidably adjacent to the second bearing element, and the first supporting plate and the second supporting plate are configured for the flexible screen to lean on.

10. The foldable electronic device as claimed in claim 9, wherein the first shaft has a first head portion and a first gear portion, the second shaft has a second head portion and a second gear portion, the first head portion and the second head portion are disposed on the body portion, and the first gear portion and the second gear portion are engaged to make the first shaft and the second shaft rotate reversely and synchronously.

11. The foldable electronic device as claimed in claim 10, wherein the first shaft and the second shaft are non-circular shafts, the first driving cam and the second driving cam respectively have a non-circular sleeve hole for matching the first shaft and the second shaft, and the first driven cam and the second driven cam respectively have a circular sleeve hole to sleeve on the first shaft and the second shaft.

12. The foldable electronic device as claimed in claim 11, wherein the first sliding groove extends substantially perpendicular to the first axis, and the second sliding groove extends substantially perpendicular to the second axis.

13. The foldable electronic device as claimed in claim 3, wherein when a number of the foldable units is even, the foldable units are symmetrically arranged perpendicular to a center line of the bendable area.

14. The foldable electronic device as claimed in claim 3, wherein the two of the foldable units that are farthest to each other are arranged in opposite directions.

15. The foldable electronic device as claimed in claim 3, wherein the body portion has an upper surface, when the first panel body and the second panel body are in the unfolded status, the lifting plate and the upper surface are substantially coplanar, and when the first panel body and the second panel body are in the folded status, the lifting plate descends and retracts from the upper surface relatively.

16. The foldable electronic device as claimed in claim 15, wherein the central base includes a magnet embedded in the body portion, the magnet constantly provides a magnetic force to the lifting plate so that the lifting plate tends to descend toward the lowest position, and when the first panel body and the second panel body are in the folded status, the magnet magnetically attracts the lifting plate to make the lifting plate descend and retract.

17. The foldable electronic device as claimed in claim 16, wherein the first driving element includes a first protruding portion, and the second driving element includes a second protruding portion, and wherein when the first panel body and the second panel body are in the unfolded status, the first protruding portion and the second protruding portion jointly abut against the lifting plate to the highest position, and when the first panel body and the second panel body are in the folded status, the first protruding portion and the second protruding portion are not in contact with the lifting plate, and the magnetic force of the magnet makes the lifting plate descend to the lowest position.

18. The foldable electronic device as claimed in claim 17, wherein the first wing includes a first edge, the second wing includes a second edge, and the hinge module further includes a first washer sleeved on the first shaft and a second washer sleeved on the second shaft, and wherein when the first panel body and the second panel body are in the unfolded status, the first edge, the second edge, the first washer and the second washer collectively abut against the lifting plate.

19. The foldable electronic device as claimed in claim 16, wherein the central base further includes a limit screw, the lifting plate further has a convex column, and the limit screw penetrates through the body portion to be screwed to the convex column.

* * * * *